(12) United States Patent
Yakubu

(10) Patent No.: US 10,220,693 B2
(45) Date of Patent: Mar. 5, 2019

(54) SELF-DEPLOYING HEATED VEHICLE COVER

(71) Applicant: Nda E. Yakubu, Toronto (CA)

(72) Inventor: Nda E. Yakubu, Toronto (CA)

(*) Notice: Subject to any disclaimer, the term of this patent is extended or adjusted under 35 U.S.C. 154(b) by 0 days.

(21) Appl. No.: 14/998,639

(22) Filed: Jan. 27, 2016

(65) Prior Publication Data

US 2017/0210216 A1 Jul. 27, 2017

(51) Int. Cl.
*H05B 1/02* (2006.01)
*B60J 11/04* (2006.01)
*H05B 3/00* (2006.01)
*H05B 3/34* (2006.01)

(52) U.S. Cl.
CPC ............ *B60J 11/04* (2013.01); *H05B 1/0236* (2013.01); *H05B 3/0014* (2013.01); *H05B 3/34* (2013.01)

(58) Field of Classification Search
CPC .................................. B60J 11/04; B60J 11/00
USPC ................................................ 296/136.02, 98
See application file for complete search history.

(56) References Cited

U.S. PATENT DOCUMENTS

| | | | | |
|---|---|---|---|---|
| 4,805,654 A * | 2/1989 | Wang | ...................... | E04H 15/06 135/139 |
| 6,357,461 B1 * | 3/2002 | Chai | ...................... | B60J 1/2011 135/117 |
| 6,935,674 B1 * | 8/2005 | Campos | ...................... | B60J 11/00 296/136.1 |
| 7,562,928 B1 * | 7/2009 | Morazan | ...................... | B60J 11/00 296/136.01 |
| 8,419,107 B2 * | 4/2013 | Manchanda | ...................... | B60J 11/06 296/136.1 |
| 8,651,555 B2 * | 2/2014 | Chan | ...................... | B60J 11/04 150/166 |
| 8,960,212 B2 * | 2/2015 | Majer | ...................... | B60J 11/00 135/88.07 |
| 9,352,642 B2 * | 5/2016 | Fogarty | ...................... | B60J 11/04 |
| 2003/0070774 A1 * | 4/2003 | Li | ...................... | B60J 11/00 160/370.21 |
| 2005/0121937 A1 * | 6/2005 | Hudgins | ...................... | B60J 11/00 296/98 |
| 2005/0242610 A1 * | 11/2005 | Galindo | ...................... | B60J 11/08 296/95.1 |
| 2006/0214465 A1 * | 9/2006 | Chau | ...................... | B60J 11/00 296/136.1 |
| 2016/0050718 A1 * | 2/2016 | Follman | ...................... | B60J 11/04 219/201 |
| 2016/0101678 A1 * | 4/2016 | Fogarty | ...................... | B60J 11/04 160/127 |

* cited by examiner

*Primary Examiner* — Pinel E Romain
(74) *Attorney, Agent, or Firm* — Malik N. Drake

(57) ABSTRACT

A vehicle cover providing a user with the ability to maintain a clean (i.e., free of ice, frost, and snow build-up) windshield and vehicle while the vehicle is not in use during times of inclement weather. The vehicle cover is automatically deployable from a housing positioned on the roof of the vehicle. The vehicle cover can be actuated remotely using a remote controller causing outward deployment of a canopy over the vehicle. The vehicle cover further provides an electrical heating means within the canopy to melt snow or ice deposited upon an existing vehicle while parked.

12 Claims, 4 Drawing Sheets

SELF-DEPLOYING HEATED VEHICLE COVER

CROSS-REFERENCE TO RELATED APPLICATIONS

This invention claims priority, pursuant to 35 U.S.C. § 120, to the U.S. Provisional Patent Application No. 62/108,219 filed on Jan. 27, 2015, entitled "Self-deploying Heated Vehicle Cover", which is incorporated by reference herein.

FIELD OF THE INVENTION

This invention relates generally to a heated cover provided having a means to deploy a canopy portion over a motor vehicle using a remote controller.

BACKGROUND OF THE INVENTION

Maintaining a clean automobile windshield is a necessary step in ensuring safety. This task is exceedingly difficult in those areas where cold weather seasons exist. While windshield wipers and washing spray do an adequate job of keeping the windshield clean while driving, they cannot cope with huge ice, frost, and snow buildup that accumulates while the vehicle is parked. Situations such as this require the driver to get out an ice scraper, and physically remove the buildup. This is not a pleasant task in freezing temperatures, as even gloved hands quickly become numb. Often, many drivers only clean a small spot in the center of the windshield, just enough to see out. This results in dangerous driving conditions, not only for the driver, but also for any others who may be sharing the road with them. Additionally, the entire vehicle should be cleaned of snow to prevent blown off snow from obscuring the vision of drivers who may be following. Accordingly, a need has risen for a means by which motorists can prevent the buildup of ice, frost and snow on their entire vehicle while parked outside. The use of the self-deploying heated vehicle cover allows drivers in cold weather climates to be assured of a clean vehicle at all times without the normal mess and fuss associated with conventional ice scrapers and snow brushes, in a manner which is quick, easy, and effective.

SUMMARY OF THE INVENTION

The best mode for carrying out the invention is presented in terms of its preferred embodiments, herein depicted in FIGS. 1 through 4. However, the invention is not limited to the described embodiments, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

BRIEF DESCRIPTION OF THE DRAWINGS

Preferred and alternative embodiments of the present invention are described in detail below with reference to the following drawings.

DESCRIPTIVE KEY

Figure 1:
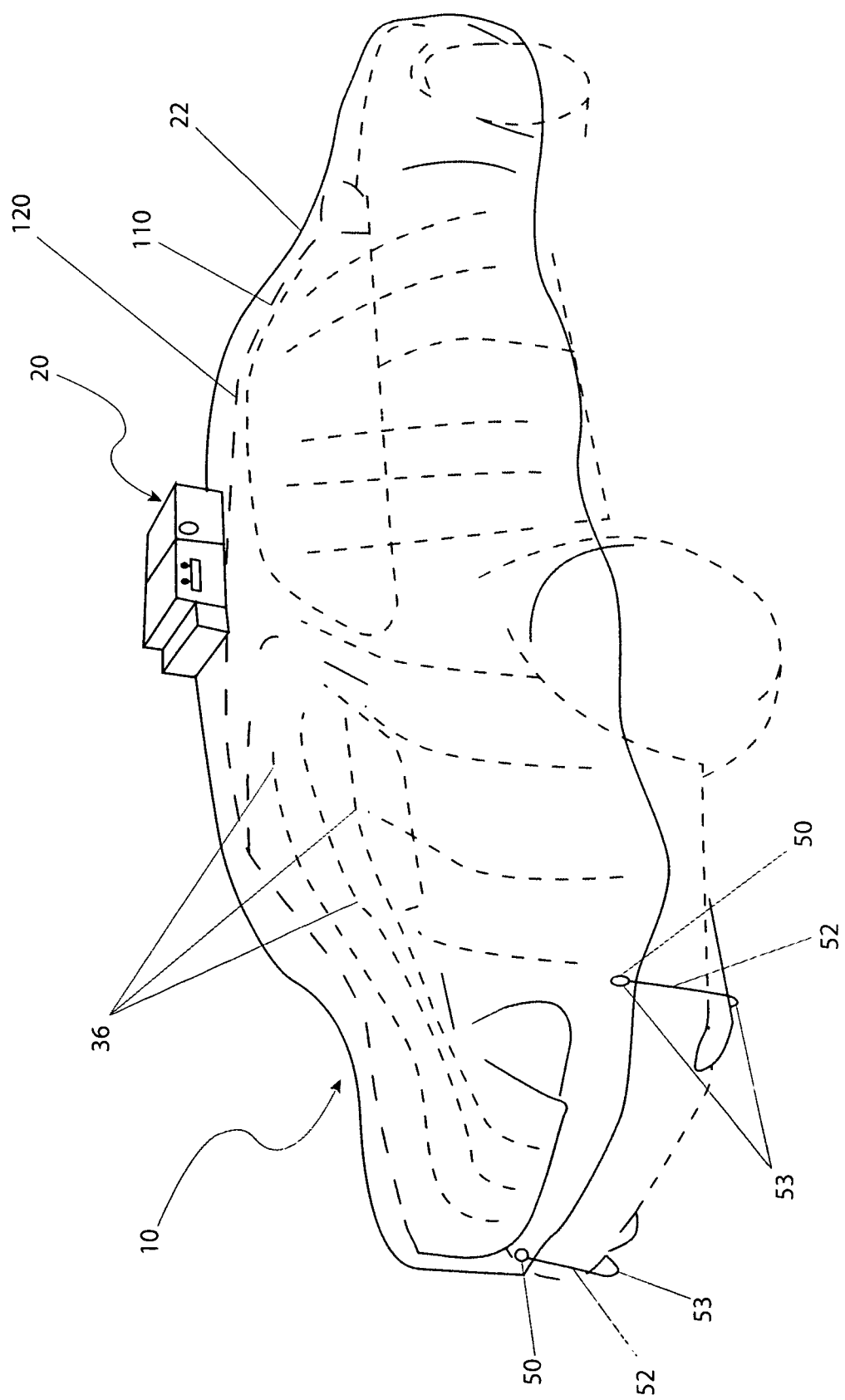
FIG. 1 is an environmental view of an automatic heated vehicle cover depicting a deployed state upon a vehicle.

10 Automatic heated vehicle cover
20 Housing assembly
21 Enclosure
22 Canopy
23 Battery compartment
25 Motor compartment
26a Manual deploy button
26b Manual retract button
28 Control module
30 Extension rod
32 Battery
33 Motor
36 Heating element
50 Grommet
52 Elastic cord
53 Hook
60 Carrying case
62 Body
64 Interior space
66 Zipper
68a First case handle
68b Second case handle
80 Remote controller
82a First remove push button
82b Second remove push button
84 Signal
100 User
110 Vehicle
120 Roof

DETAILED DESCRIPTION OF THE PREFERRED EMBODIMENT

The present invention describes an automatic heated vehicle cover (herein described as the "apparatus") 10, which provides a vehicle cover automatically deployable from a housing assembly 20 placed upon a roof portion 120 of the vehicle 110. The apparatus 10 is actuated remotely using a remote controller 80 causing outward deployment of a canopy 22 over the vehicle 110. The apparatus 10 further provides an electrical heating means within the canopy 22 to melt snow or ice deposited upon an existing vehicle 110 while parked.

Figure 2:
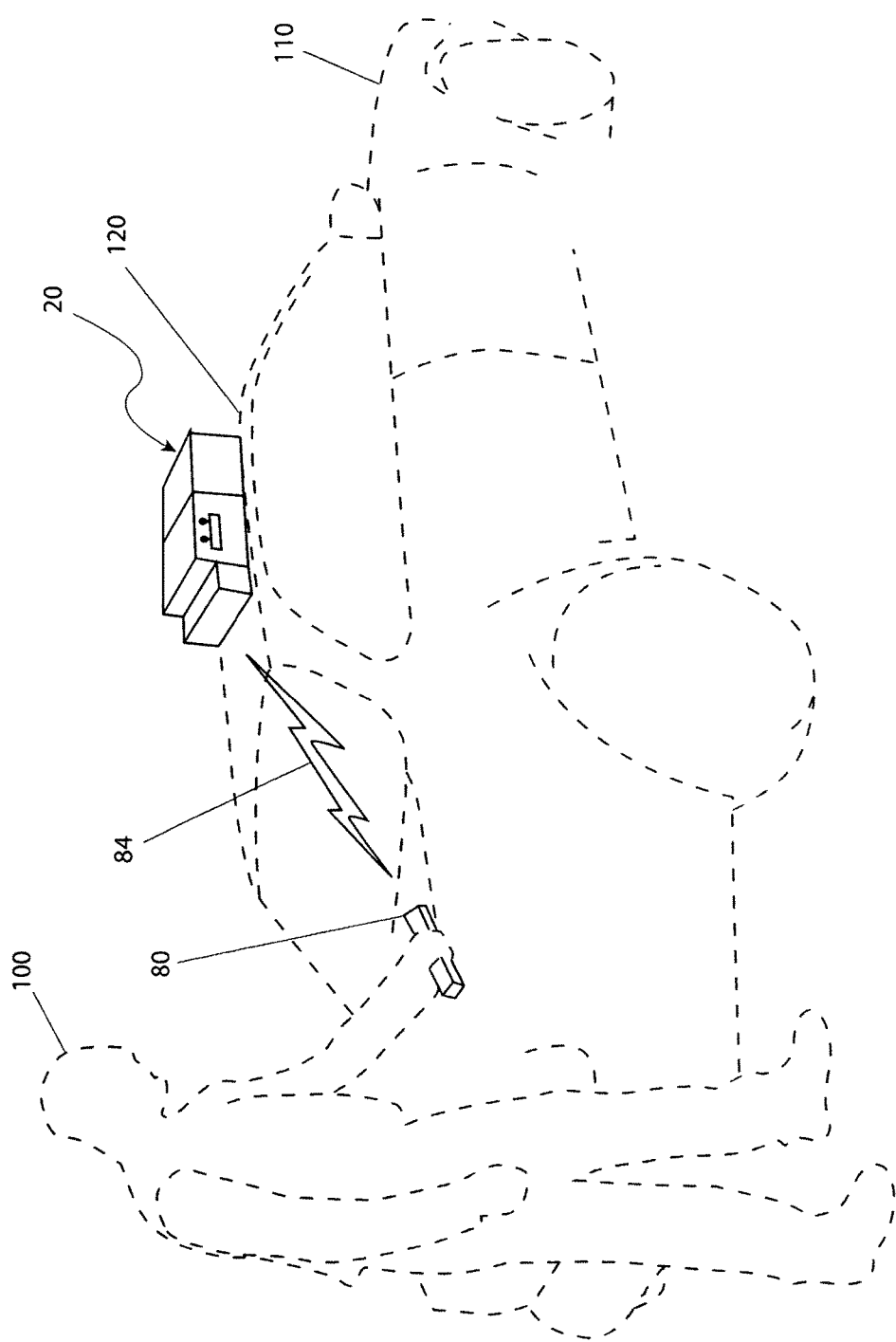
FIG. 2 is another environmental view of the vehicle cover depicting a pre-deployed state upon a vehicle.

Referring now to FIGS. 1 and 2, environmental views of the apparatus 10 depicting deployed and pre-deployed states upon the vehicle 110, according to the preferred embodiment of the present invention, are disclosed. The apparatus 10 is to be installed upon a vehicle 110 when inclement weather is expected. The apparatus 10 aids in the elimination of built-up ice and snow upon the motor vehicle 110.

The apparatus 10 includes a housing assembly 20 which includes a weather-resistant plastic or metal enclosure 21 made up of sections including a battery compartment 23 containing a battery 32, a motor compartment 25 containing at least one (1) motor 33, a control module 28, and a plurality of manual push-buttons 26a, 26b. The control buttons 26a, 26b provide a means to manually initiate deployment and retraction of the canopy 22.

The perimeter edge portions of the canopy 22 may be affixed, if desired, to the body portion of the vehicle 110 for improved stability using integrated grommet portions 50 of the canopy 22 and corresponding elastic cords 52. The grommets 50 are arranged along perimeter and corner portions of the canopy 22, and are envisioned to work in conjunction with the hooks 53 on elastic cords 52, which are envisioned to be flexible linear devices.

The canopy portions 22 of the apparatus 10 is envisioned to be introduced in various overall sizes for application upon correspondingly sized vehicles 110; however, it is understood that the apparatus 10 may be sized for use upon various types of vehicles and other objects, such as, but not limited to: boats, small vehicles, large vehicles, sport utility vehicles, mini vans, industrial equipment, airplanes, and the like, and as such should not be as a limiting factor of the apparatus 10. The canopy 22 provides an umbrella-like structure having integral electrical heating elements 36 powered by the battery 32. The canopy 22 is envisioned to be made of a heavy-mill vinyl laminate or equivalent weather tolerant material capable of containing the heating elements 23 by being integrally-molded or otherwise bonded within the laminated construction.

Figure 3:
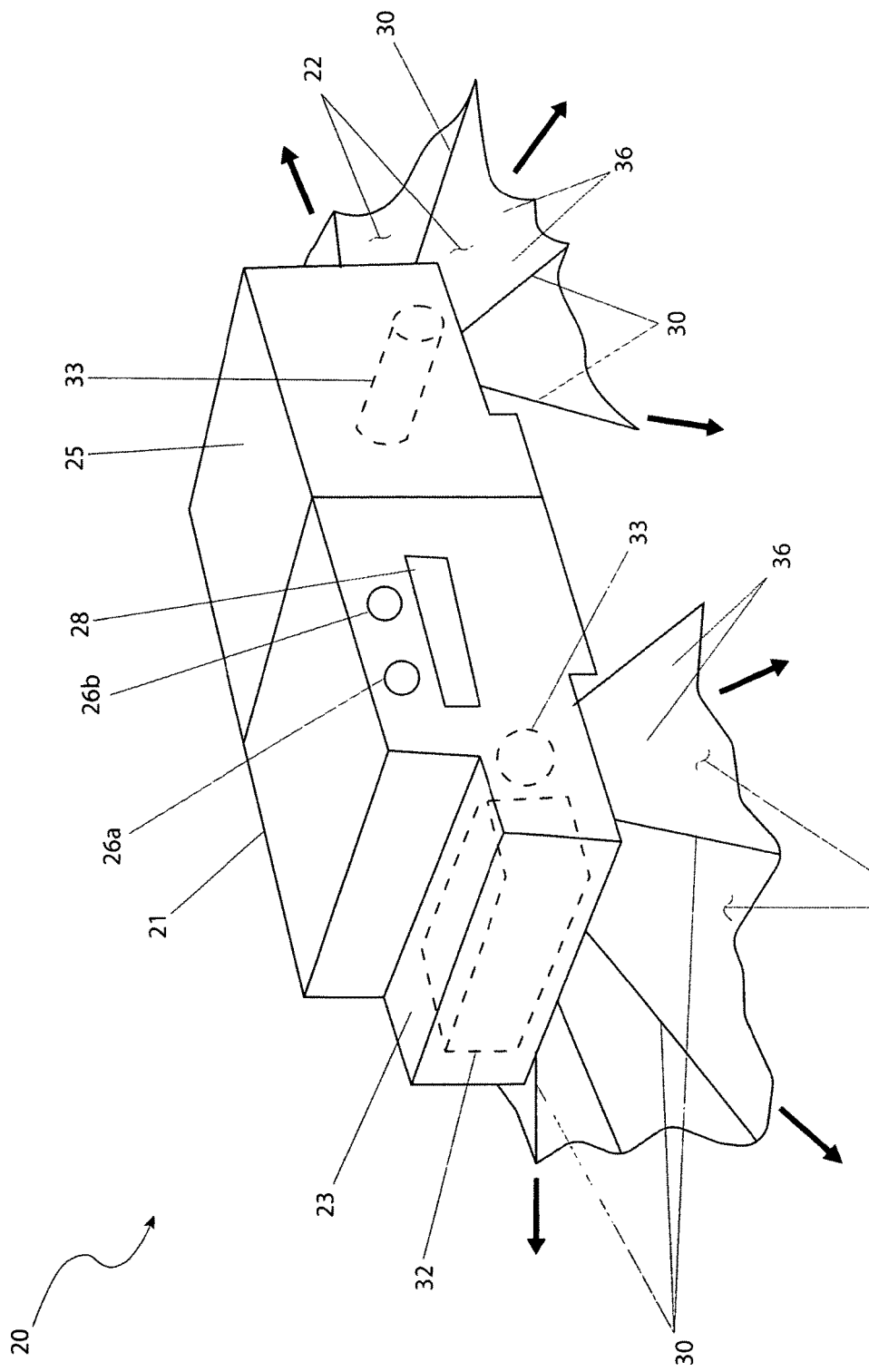
FIG. 3 is a close-up view of a housing assembly portion of the vehicle cover.
Figure 4:
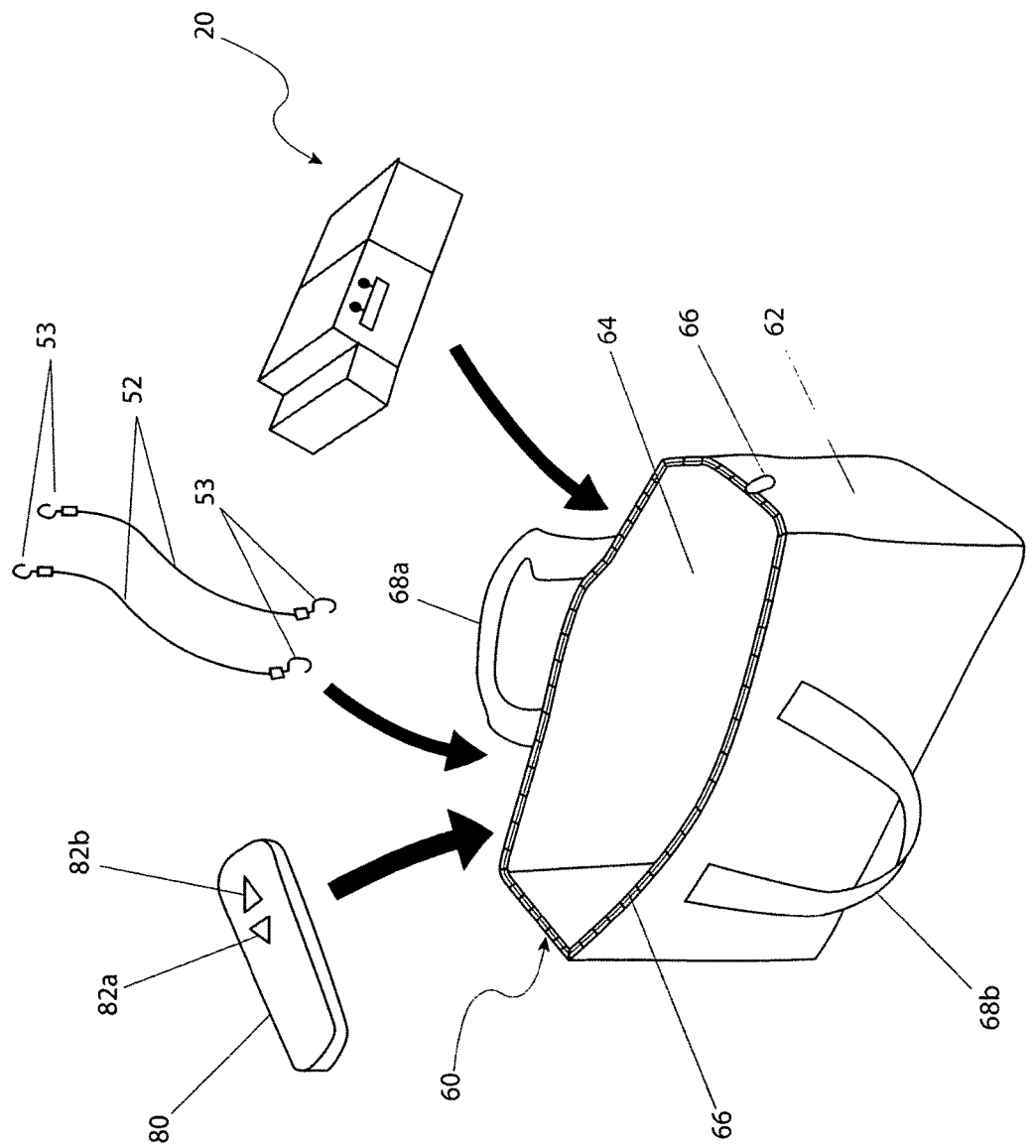
FIG. 4 is a perspective view of a carrying case portion of the vehicle cover.

To install the apparatus 10, the user places the housing assembly 20 upon a roof portion 120 of the vehicle 110 and then actuates the motor 33 using the remote controller 80 (also see FIG. 4). The motor 33 provides a means to extend a plurality of extension rods 30 arranged and extending outwardly in a radial manner from the housing assembly 20 (see FIG. 3.). Following deployment of the canopy 22, the battery 32 provides power to a plurality of heating elements 36 within the canopy 22, thereby enabling continuous heating to melt any deposited snow or ice until the user 100 returns to their vehicle 110.

The heating elements 36 are envisioned to be arranged in a radial and divergent pattern throughout the canopy 22. The heating elements 36 are in electrical communication with the control module 28 within the housing assembly 20. The control module 28 directs power from the battery 32 to the heating elements 36 upon deployment of the canopy 22. The heating elements 36 are to be capable of producing sufficient heat so as to melt snow and ice deposited upon the canopy 22, thereby saving time and energy while preparing one's vehicle 110 for use following inclement weather. The heating elements 36 are envisioned to provide heat in a continuous manner to the canopy 22 so as to melt any deposited snow or ice until the user returns to their vehicle 110. Following use of the apparatus 10 during inclement weather, the user 100, actuates retraction of the extension rods 30 and canopy 22 into the enclosure 21, and removes the housing assembly 20 to reveal a dry vehicle 110. The housing assembly 20 is then placed within a carrying case 60 for storage in the vehicle's trunk (see FIG. 4).

Referring now to FIG. 3, a close-up view of a housing assembly portion 20 of the vehicle cover 10, according to a preferred embodiment of the present invention, is disclosed. The motor 33 within the enclosure 21 provides a means to extend the plurality of extension rods 30 which extend outwardly and are arranged in a radial manner. The extension rods 30 are attached to, and support the canopy 22 which is coincidentally fed out by the motion of the extension rods 30 to cover the vehicle 110.

The canopy portion 22 provides an umbrella-like structure having embedded electrical heating elements 36 which are powered by the battery 32. Following the deployment of the canopy 22, the battery 32 provides power to the heating elements 36 via the control module 28.

The motor 33 is envisioned to utilize a slip-stick or stepping type piezoelectric motor similar to those manufactured by PIEZOMOTOR®, PHYSIK INSTRUMENTE®, and others. The piezoelectric motor 33 is to use the principle of stored charges with vibrating sound to produce bidirectional motion, in this case to motion the extension rods 30 and attached canopy 22 in and out. Piezoelectric technology utilizes a piezoelectric effect to produce ultrasonic vibrations in order to produce a linear or rotary motion.

The control module 28 receives power from the battery 32, and receives an initiating wireless signal 84 from the remote controller 80, thereby energizing the motors 33 to deploy or retract the canopy 22. The control module 28 is envisioned to include all electrical and electronic equipment necessary to drive and control the motors 33 such as, but not limited to: circuit boards, microchips, embedded software, and the like. The battery 32 is envisioned to be a rechargeable type which may be removed for remote charging, or be connected to a power source when the apparatus 10 is not in use.

The housing assembly 20 includes a plurality of manual push buttons along an exterior surface, such as, but not limited to, a deploy button 26a, and a retract button 26b which provides an alternate means to manipulate the canopy 22 in an identical manner as the push button portions 82a, 82b upon the remote controller 80 (see FIG. 4).

Referring now to FIG. 4, a perspective view of a carrying case portion 60 of the apparatus 10, according to a preferred embodiment of the present invention, is disclosed. The apparatus 10 provides a means of compact storage within a trunk portion of the vehicle 110, or other preferred storage locations, via a rugged textile carrying case 60.

Following use of the apparatus 10, the user 100 utilizes either the push buttons 82a, 82b located upon the remote controller 80 or utilizes the manual push buttons 26a, 26b upon the enclosure 21 to retract the canopy 22 into or adjacent to the enclosure 21 to provide a compact configuration. The housing assembly 20 may then be placed within the carrying case 60. The carrying case 60 includes an elongated textile body portion 62 having at least one (1) "U" shaped textile handle 68a or 68b and a closure means along a top surface such as a zipper 66, and is to have sufficient space 64 to contain the housing assembly 20 and the remote controller 80.

The remote controller 80 provides a means to transmit a wireless signal 84 to the housing assembly 20 to initiate manipulation of the canopy 22 from a distance. The remote push button portions 82a, 82b of the remote controller 80 provide respective functions to deploy and retract the canopy 22.

It is envisioned that the styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 through 3.

The method of installing and utilizing the apparatus 10 may be achieved by performing the following steps: procuring a model of the apparatus 10 having an overall size which corresponds to an intended vehicle 110 or an item to be covered; storing the carrying case 60 containing the housing assembly 20 and remote controller 80 within a trunk portion of the vehicle 110 until needed; parking the vehicle 110 with an anticipation of inclement weather and removing the housing assembly 20 from the carrying case 60; placing the housing assembly 20 upon a roof portion 120 of the vehicle 110; deploying the canopy 22 over the vehicle 110 by pressing upon the second remote push button portion 82b of the remote controller 80; allowing the remote controller 80 to transmit a wireless signal 84 to the control module 28; allowing the control module 28 to activate the motor 33 causing the extension rods 30 to extend and pay out the canopy 22 out over the vehicle 110; allowing the control module 28 to supply a current to the heating elements 36 within the canopy 22 upon deployment; securing the canopy 22 upon the vehicle 110 by extending and affixing perimeter edge portions of the canopy 22 to body portions of the vehicle 110 using the grommets 50 and elastic chords 52; allowing the heating elements portions 36 of the apparatus 10 to provide continuous heating of the canopy 22 to melt any deposited snow or ice until the user 100 returns to their vehicle 110; releasing and removing the elastic chords 52 from the grommets 50 and from the body portions of the vehicle 110; pressing upon the first remote push button 82a to retract the canopy 22 into the enclosure 21; and, removing the housing assembly 20 from the roof 120 of the vehicle 110.

The method of storing the apparatus 10 may be achieved by performing the following steps: placing the housing assembly 20, remote controller 80, and elastic chords 52 within the interior space portion 64 of the carrying case 60; closing the carrying case 60 using the zipper 66; and, benefitting from time and energy saved while preparing one's vehicle 110 for use following inclement weather.

The manual push buttons 26a, 26b located upon the housing assembly 20 may be utilized to provide an alternate means to manipulate the canopy 22, if desired, in an identical manner as the remote push button portions 82a, 82b of the remote controller 80.

The foregoing descriptions of specific embodiments of the present invention have been presented for the purposes of illustration and description. They are not intended to be exhaustive or to limit the invention to precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle cover assembly, comprising
a housing assembly, adapted to be installed on a roof of a vehicle;
a canopy housed within said housing assembly via a plurality of spring-loaded ribs;
a deploying means located within said housing assembly for deploying said canopy from a stored configuration to a deployed configuration;
a plurality of heating elements disposed within said canopy;
a plurality of securing means for securing bottom portions of said canopy to a vehicle;
a plurality of holes positioned along one longitudinal edge of a semi-deployed canopy;
a plurality of hooks positioned along one longitudinal edge of a semi-deployed canopy; and
a handle;
wherein said canopy in said deployed configuration is adapted to be in electrical communication with a power source of said vehicle;
wherein the handle is positioned at a longitudinal end of the vehicle over assembly when the canopy is in a stored configuration;
wherein the canopy opens in a circular fashion when being deployed from a stored configuration to a deployed configuration;
wherein the canopy, when semi-deployed, has two longitudinal edges, with one edge having the plurality of holes and other edge having the plurality of hooks; and
wherein when the canopy is in a deployed configuration, the two longitudinal edges are secured to each other.

2. The vehicle cover assembly of claim 1, wherein said deploying means further comprises:
a motor;
a plurality of extension rods in mechanical communication with said motor, each extension rod affixed to said canopy;
a control module in electrical communication with said motor; and
a deploying switch providing electrical communication between a power source and said control module;
wherein said deploying switch operates said motor to configure said canopy in said deploying configuration; and
wherein said reversing switch operates said motor to configure said canopy in said stored configuration.

3. The vehicle cover assembly of claim 2, further comprising a remote control in wireless communication with said control module.

4. The vehicle cover assembly of claim 1, wherein said plurality of said heating elements are embedded in a parallel pattern throughout said canopy.

5. The vehicle cover assembly of claim 1, wherein said plurality of heating elements are bonded in a parallel pattern to said canopy.

6. The vehicle cover assembly of claim 1, wherein each of said plurality of securing means is an elastic member having a hook at distal ends thereof.

7. A vehicle cover assembly, comprising:
an elongated case having at least one handle and a zipper;
a pole;
a canopy affixed to an upper portion of said pole via a plurality of spring-loaded ribs;
a deploying means located on said pole for deploying said canopy from a stored configuration to a deployed configuration;
a plurality of heating elements disposed within said canopy; and
a plurality of securing means for securing bottom portions of said canopy to a vehicle;
wherein said canopy in said deployed configuration is adapted to deploy over a top and sides of said vehicle;
wherein said plurality of electrical heating elements are adapted to be in communication with a power source of said vehicle;
wherein said cover and said securing means are capable of being collapsed and stored within said case; and
wherein the pole is detached from the case.

8. The vehicle cover assembly of claim 7, wherein said deploying means further comprises:
a motor;

a plurality of extension rods in mechanical communication with said motor, each extension rod affixed to said canopy;
a control module in electrical communication with said motor; and
a deploying switch providing electrical communication between a power source and said control module;
wherein said deploying switch providing electrical communication between a power source and said control module; and
wherein said deploying switch operates said motor to configure said canopy in said stored configuration.

9. The vehicle cover assembly of claim 8, further comprising a remote control in wireless communication with said control module.

10. The vehicle cover assembly of claim 7, wherein said plurality of heating elements are embedded in a parallel pattern throughout said canopy.

11. The vehicle cover assembly of claim 7, wherein said plurality of heating elements are bonded in a parallel pattern to said canopy.

12. The vehicle cover assembly of claim 7, wherein each of said plurality securing means is an elastic member having a hook at distal ends thereof.

* * * * *